United States Patent
Korodi

[11] 3,942,859
[45] Mar. 9, 1976

[54] ELECTRICAL CONDUCTOR WITH LIGHT INDICATING MEANS

[76] Inventor: Miklos B. Korodi, 440 E. 79th St., New York, N.Y. 10017

[22] Filed: Nov. 11, 1974

[21] Appl. No.: 522,903

[52] U.S. Cl. ............... 339/113 L; 313/110; 313/324
[51] Int. Cl.² .......................................... H01R 3/00
[58] Field of Search..................... 313/110, 312, 324; 340/380, 252 R, 252 P; 339/113 L; 315/129; 313/1

[56] References Cited
UNITED STATES PATENTS

| | | | |
|---|---|---|---|
| 1,935,771 | 11/1933 | Feurstein et al. | 339/113 L X |
| 2,644,113 | 6/1953 | Etzkorn | 313/1 X |
| 2,716,712 | 8/1955 | Alexander | 313/110 |
| 3,018,474 | 1/1962 | Cluck et al. | 340/252 R X |
| 3,660,590 | 5/1972 | Conant | 350/96 B X |

FOREIGN PATENTS OR APPLICATIONS

| | | | |
|---|---|---|---|
| 2,061,437 | 6/1972 | Germany | 339/113 L |
| 612,015 | 1/1961 | Canada | 340/252 P |

*Primary Examiner*—Palmer C. Demeo
*Attorney, Agent, or Firm*—Sherman & Shalloway

[57] ABSTRACT

A safety power conductor is disclosed in which the conductor includes light-emitting means in electrical communication with the conductor to signal the location of the conductor and the presence of an electrical potential in the conductor with respect to an electrical base or ground. The light emitting means is capable of transmitting the light signal both along the length of the conductor and laterally through the insulation or the covering of the conductor, at least at points spaced along the length of the conductor to provide a visible indication of both the actual location of the conductor and the fact that the conductor is in circuit with a source of electricity.

3 Claims, 5 Drawing Figures

ELECTRICAL CONDUCTOR WITH LIGHT INDICATING MEANS

BACKGROUND OF THE INVENTION

The present invention relates to electrical conductors and is concerned, more particularly, with electrical conductors for services in which the location and status of the conductor are of concern in the utilization and servicing of the conductor and the equipment which is to be served by the conductor.

BRIEF DESCRIPTION OF THE PRIOR ART

Power cables such as domestic extension cords and the heavier industrial cords which are used in construction, welding and the like, as well as those which are installed in relatively inaccessible areas, such as occurs in aircraft or boats, have presented certain problems.

Where movable cords or cables are used in the home or in industrial areas, they present a distinct safety hazard in poor lighting conditions and frequently are the cause of accidents, primarily because of tripping over such conductors or hitting such conductors with equipment which is detrimental to its structure or insulating integrity.

This problem has been endured without a positive and reliable means for signalling the location of the cords or cables. Usually, where the problem is recognized as being of significance, the attempts to improve the situation have included the expedient of maintaining at least a minimum of lighting and resultant visibility in the area in which the cables are to be moved or utilized. However, in the absence of rigid safety rules and a constant enforcement of these rules, there is a tendency for laxity in establishing and maintaining the necessary lighting level and a consequent continuance of accidents. This is especially true in the case of cords which are used for home movie projection or the presentation of similar visual displays in auditoriums, in which cases it is either unsuitable or quite difficult to provide adequate safety lighting without special lighting fixtures.

In cases in which conductors are permanently installed in inaccessible areas such as in the fuselage of aircraft or in the hulls of boats, it is often extremely difficult to "trouble-shoot" electrical problems because of the obscure location of the conductors and the consequent need to employ tracing means to detect "open" circuits or otherwise malfunctioning circuitry.

Therefore, the prior electrical conductors have not been found to be entirely satisfactory for all services.

SUMMARY OF THE INVENTION

In general, the preferred form of conductor line of the present invention comprises a conductor having an insulating covering, and light emitting means for emitting light laterally and along at least a portion of the length of the conductor, the light emitting means being actuateable in response to the presence of an electrical potential in said conductor.

Preferably, the conductor line of the present invention includes an elongated tubular channel in the covering of the conductor and extended longitudinally thereof, and the light emitting means is positioned in the tubular channel and is in electrical communication with the conductor.

OBJECTS OF THE INVENTION

It is an object of the present invention to provide an electrical conductor which is safe and which is self-indicating of the presence of an electrical potential therein.

It is another object of the present invention to provide a portable electrical conduit which is visible in the absence of ambient lighting.

It is another object of the present invention to provide a movable electrical conductor which is flexible, for convenience of positioning and repositioning, and which is visible in both its original position and a subsequent position regardless of the presence or absence of ambient light.

It is a still further object of the invention to provide a portable electrical conductor which is flexible for convenience of positioning and repositioning and which is responsive to the presence of an electrical potential therein to provide a visual indication of its position regardless of the presence or absence of ambient light.

Another object of the present invention is the provision of an electrical conductor which is visible along its length regardless of the presence or absence of ambient light.

A further object of the present invention is the provision of an electrical conductor which is responsive to the presence of an electrical potential therein to provide a visual indication of the presence of the electrical potential therein.

A still further object of the present invention is the provision of an electrical conductor which is responsive to the presence of an electrical potential therein to provide a visual indication along its length to exhibit the presence of the electrical potential.

BRIEF DESCRIPTION OF THE DRAWINGS

These and other objects of the invention, as well as a better understanding thereof may be derived from the following description and the accompanying drawings, in which.

DETAILED DESCRIPTION OF THE PREFERRED EMBODIMENT

Figures 1, 1A, 2, 3, 4:
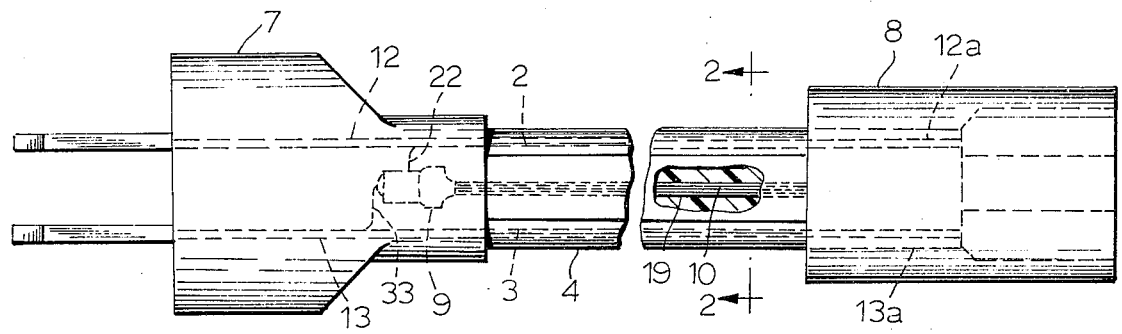
FIG. 1 is a side view of the preferred form of twinconductor of the present invention.
FIG. 1a is a view similar to FIG. 1, on an enlarged scale, showing a modified form of the invention.
FIG. 2 is a sectional view taken along the lines 2—2 of FIG. 1.
FIG. 3 is a side view, similar to that of FIG. 1 and showing a modified form of the invention.
FIG. 4 is a sectional view taken along the lines 4—4 of FIG. 3.

As shown in FIGS. 1 and 2, the preferred form of the present invention comprise an electrical line or cable 1 having a pair of parallel electrical conductors 2 and 3, respectively, which are separated and insulated by an insulating covering 4. At its opposite ends 5 and 6, the cable is provided with male and female terminal fittings 7 and 8, respectively, for receiving an electrical potential from a source-fitting (not shown) for transmission to a remote location at the opposite end of the cable.

The fittings 7 and 8 include connectors 12, 13 and 12a, 13a, respectively, which provide electrical contact of their associated conductor 2 and 3, respectively, with contact fittings exterior of the cable. In the terminal fitting 7, a small light bulb 9 is mounted substantially intermediate the connectors 2 and 3 and is in electrical communication therebetween by suitable means as represented schematically by the dotted lines 22 and 33, respectively.

The covering 4 has a tubular channel 19 therein which extends longitudinally with the conductors 2 and 3 and which is aligned with the bulb 9 at least at its end adjacent to the bulb. Within the channel 19, a plurality of optical fibers 10 also are aligned with the bulb 9, at their end adjacent the bulb, and extend along the length of the conductors.

The optical fibers 10 are to be sufficiently flexible to accommodate the flexibility requirements of the cable 1 and may take any suitable form which serves the purpose, I have found that a plurality of glass fiber strands, such as are currently used in the fiber-optic type of lamp, to be suitable for the purpose. It should be noted that, even if the strands should be transversly broken by abuse of the cable, the nature and light-conducting properties of such strands will permit the continued transmission of light from the bulb 9 along the length of the cable.

I have found that the bulb may be quite effectively formed in the manner of the small neon-type bulbs which are frequently used as "night lights" or indicator lamps on display panels. These bulbs provide sufficient lumens for moderate lengths of cable such as the domestic extension cords and may be appropriately increased in size and intensity for installation in heavier or industrial cables.

It is to be understood that the covering 4 is to be at least partially transparent to light and that the transparent zone is to extend between the optical fibers 10 in the channel 19 and the external surface of the cable covering, in order to permit the transmission of the light from the bulb 9, via the optical fibers, to the exterior of the cable along its length.

In use of the cable of FIG. 1, the connection of the terminal fitting 7 to any appropriate source of electrical potential will cause excitation of the bulb 9 and a resultant transmission of light along the optical fibers 10 and, therefore, laterally through the transparent covering 4 to the surface thereof to be visible to an observer. The visibility thus imparted along the length of the cable both acts as a safety measure to prevent tripping over the cable in poor light and serves as a condition-indicator to signal the presence of the electrical potential in the cable.

A modified form of the invention of FIG. 1 is shown in FIG. 1a, in which the exterior surfaces of the optical fibers are provided with indentations or depression 11 which are spaced from each other along the length of the cable. The remaining structure shown in FIG. 1a is similar to that shown in FIG. 1.

In use of the cable of FIG. 1a, the spaced depressions 11 are effective in causing bright spots along the length of the cable, since they provide a discontinuous surface which interrupts the usual internal reflection of light within the optical fibers and permits the escape of greater amounts of light therefrom, at the locations of the depressions 11.

In the modified form of the invention shown in FIGS. 3 and 4, in which the same numerals, primed ('), are used to identify elements similar to those of FIG. 1, the light emitting means is modified by the elimination of the bulb and optical fibers. In this modification, the light emitting means includes a voltage-sensitive or excitable filling in the channel 19', which is sealed to prevent the escape of the filling, I prefer to use the readily available neon gas compositions as the excitable filling.

Excitation of the neon in the channel 19' is effected by electrodes, such as those shown schematically by the dotted lines 22' and 33', which are longitudinally separated along the length of the channel 19'.

The cable shown in FIGS. 3 and 4 is particularly advantageous in services which require a high degree of flexibility of the cable, since the "neon tube" formed in the channel 19' does not impose any additional rigidity to the cable and is capable of extreme degrees of flexing within the limits of integrity of the insulating covering 4'.

It is apparent, from the foregoing, that the present invention provides an electrical conductor line or cable which is especially advantageous in use and which provides unique advantages in the facility and safety of its use. The cables of the present invention not only provide a visible indication of their presence and location, to prevent tripping, but also indicate their condition of being "live," if they are connected to an electrical source, to prevent accidental shock incidents and to aid in the selection of a "live" or "dead" line or cable from a plurality of such cables.

Various changes may be made in the details of the invention, as disclosed, without sacrificing the advantages thereof or departing from the scope of the appended claims.

What we claim is:
1. An electrical conductor including
   a. at least one elongated conductor member;
   b. an insulating covering on said conductor member;
   c. light emitting means in electrical communication with said conductor member, said light emitting means including
   d. light conducting means for conducting said light longitudinally of said conductor member, said light emitting means being positioned within said insulating covering, said insulating covering being at least partially transparent,
   e. said light emitting means including
   f. a bulb and
   g. a longitudinal channel in said insulating covering and at least partially aligned with said bulb, and
   h. at least one optical fiber in said longitudinal channel.
2. The electrical conductor of claim 1 in which said optical fiber is glass.
3. The electrical conductor of claim 1 in which said optical fiber includes longitudinally spaced indentations on its surface.
   (h) at least one optical fiber in said longitudinal channel.

* * * * *

UNITED STATES PATENT OFFICE
CERTIFICATE OF CORRECTION

Patent No. 3,942,859　　　　　　　　　　Dated　March 9, 1976

Inventor(s)　MIKLOS B. KORODI

It is certified that error appears in the above-identified patent and that said Letters Patent are hereby corrected as shown below:

Column 4, lines 60-61, delete in their entirety.

Signed and Sealed this eighteenth Day of May 1976

[SEAL]

Attest:

RUTH C. MASON
*Attesting Officer*

C. MARSHALL DANN
*Commissioner of Patents and Trademarks*